(12) United States Patent
Stieber et al.

(10) Patent No.: US 7,522,880 B2
(45) Date of Patent: Apr. 21, 2009

(54) WIRELESS NETWORKED CASH MANAGEMENT SYSTEM

(75) Inventors: Jon R. Stieber, Oconomowoc, WI (US); Thomas P. Adams, Oconomowoc, WI (US); Robert L. Zwieg, Watertown, WI (US); William R. Kirkman, Mukwonago, WI (US)

(73) Assignee: Talaris Inc., Watertown, WI (US)

( * ) Notice: Subject to any disclaimer, the term of this patent is extended or adjusted under 35 U.S.C. 154(b) by 1448 days.

(21) Appl. No.: 10/005,023

(22) Filed: Dec. 4, 2001

(65) Prior Publication Data

US 2002/0111157 A1    Aug. 15, 2002

Related U.S. Application Data

(60) Provisional application No. 60/251,200, filed on Dec. 4, 2000.

(51) Int. Cl.
*H04B 7/00* (2006.01)
*H04H 40/00* (2008.01)
*G06Q 40/00* (2006.01)

(52) U.S. Cl. .................... 455/41.2; 455/41.3; 455/3.06; 705/43

(58) Field of Classification Search ................ 455/3.06, 455/556.1, 41.1, 41.2, 41.3, 74; 144/216, 144/217, 219, 230; 705/43; 902/8
See application file for complete search history.

(56) References Cited

U.S. PATENT DOCUMENTS

| | | | |
|---|---|---|---|
| 5,222,583 A | 6/1993 | Bergmann et al. | |
| 5,943,655 A | 8/1999 | Jacobson | |
| 6,023,241 A | 2/2000 | Clapper | |
| 6,028,764 A | 2/2000 | Richardson et al. | |
| 6,069,588 A | 5/2000 | O'Neill, Jr. | |

(Continued)

FOREIGN PATENT DOCUMENTS

EP    0 977 163 A2    7/1999

(Continued)

OTHER PUBLICATIONS

Haartsen J: "Bluetooth—The Universal Radio Interface For Ad Hoc, Wireless Connectivity" On—Ericsson review, Ericsson. Stockholm, SE, No. 3, 1998, pp. 110-117, XP000783249.

*Primary Examiner*—Duc Nguyen
*Assistant Examiner*—Eugene Yun
(74) *Attorney, Agent, or Firm*—Boyle Fredrickson, S.C.

(57) ABSTRACT

A wireless networked cash management system includes a coin handling device (13, 14, 17) for performing at least one of the operations of coin counting, coin sorting, coin dispensing and cash redemption, a currency handling device (15, 16, 17) for performing at least one of the operations of note counting, note dispensing, note sorting and cash redemption, and a control unit (12) for performing at least one of the operations of monitoring cash handling, accounting for cash dispensing, providing for cash settlement, monitoring maintenance information and providing commands for controlling operation one of the cash handling devices (13, 14, 15, 16, 17) and a wireless communication network operating in a range of frequencies made available for locally distributed wireless networks for allowing communication of data between the control unit (12) and the cash handling devices (13, 14, 15, 16, 17). Computer peripheral I/O devices can also be added to the system for communicating over the network with the control unit (12).

22 Claims, 2 Drawing Sheets

U.S. PATENT DOCUMENTS 6,418,358 B1 7/2002 Armanini et al.
2001/0051922 A1* 12/2001 Waller et al. .................. 705/43

FOREIGN PATENT DOCUMENTS

| EP | 1 030 277 A2 | 8/2000 |
| --- | --- | --- |
| JP | 6312061 A2 | 11/1994 |
| JP | 11114209 A2 | 4/1999 |
| WO | WO 99/23601 | 5/1999 |
| WO | WO 00/42744 A1 | 7/2000 |
| WO | WO 00/56105 A1 | 9/2000 |

* cited by examiner

WIRELESS NETWORKED CASH MANAGEMENT SYSTEM

CROSS REFERENCE TO RELATED APPLICATION

The benefit of priority based on U.S. Prov. Patent Appl. No. 60/251,200, filed Dec. 4, 2000, is claimed herein.

TECHNICAL FIELD

The present invention relates to automated cash handling systems, and more particularly to an automated cash handling system connected through a wireless communication network.

DESCRIPTION OF THE BACKGROUND ART

Automated cash handling equipment is utilized in retail trade, banking and gaming industries and anywhere else where large amounts of notes or coinage must be counted, sorted and packaged. Automated note and coin counting equipment is used in bank vaults and other locations for both sorting and counting deposits. Note and coin counters can also be used by tellers to verify the value of transactions prior to issuing a receipt to a customer. In gambling casinos, gaming machines must be "cashed up", which means that a certain base level of cash must be provided for operation, but excess cash resulting from gambling must be removed. Cash redemption centers now allow consumers to bring in their accumulated change, for counting and exchange for a voucher for shopping at a retail food store, for example.

While automated cash handling systems are advantageous for businesses in which significant levels of cash are exchanged, there are also problems associated with these systems. Cash dispensing machines contain a limited supply of money. The supply level in these machines must be monitored and the machine refilled to maintain the supply of available cash at or above a minimum level such that a sufficient supply is available for customers. Cash receiving machines, on the other hand, can only accept a limited amount of money. These machines must be monitored and emptied when necessary to prevent, for example, expensive downtime for gaming machines. Additionally, because automatic cash handling machines handle large amounts of cash, it is important to be able to verify both that the equipment is operating as expected and that personnel involved in loading and unloading the machines are doing so correctly. It is desirable, therefore, to monitor cash levels in automated cash handling machines.

To monitor the assets in automated cash handling machines, it is known to connect a plurality of automated cash handling machines into a network. These networks generally comprise a controller coupled to one or more cash handling machines via interface cables. While acceptable in a number of applications, these systems have limitations. First, due to the need to run cabling to each machine, wired networks are relatively inflexible when additional equipment is required, or when devices are moved to a new location. Secondly, such equipment requires special installation measures when installed in areas accessible by customers, such as in a gaming casino.

Bergmann et al., U.S. Pat. No. 5,222,583, discloses a group of gaming machines which are co-located with a money changing machine. A master device may collect data from the gaming machines through an RF network, and pass such data on to a central control unit. Japanese Patent Application Publication No. 11114209 shows a plurality of coin counting units, perhaps located at a point of sale, which transmit cash collection data to a central control unit via RF communications. Japanese Patent Application Publication No. 6312061 shows another a gaming machine management system in which cash accumulation data is collected and transmitted to a floor management machine, and then to a central computer.

There remains a need for an automated cash handling system in which a control unit can be selectively coupled to any of a plurality of different types of automated cash handling equipment, such as counters, sorters, dispensers and redemption machines for coin and currency. The device could also preferably be coupled to standard public communication networks such as the internet, or internal intranets. Furthermore, the device would preferably communicate in a globally available frequency band for general usage, thereby preventing interference with other devices, and allowing operation in any location.

SUMMARY OF THE INVENTION

The invention is provides a wireless networked cash management system, comprising at least one cash handling device for performing at least one of the operations of coin counting, note counting, coin sorting and totalizing, note sorting and totalizing, coin dispensing, note dispensing and cash redemption, and a control unit for performing with respect to cash handling device at least one of the operations of monitoring cash handling, accounting for cash dispensing, providing for cash settlement, monitoring maintenance information and providing commands for controlling operation cash handling device. The cash handling device and the control unit communicate through a wireless communication network operating in a range of frequencies available for locally distributed wireless networks.

In addition, I/O devices can be added to the system, including peripheral input, output, and communication devices such as displays and printers; scanners, keyboards, and touch screens, and pagers, cellular phones, and personal digital assistants, among other known devices. The control unit can also be connected to an additional external network, such as an intranet or the Internet, via one of many types of modems.

In this system, the control unit is programmed to receive data from the cash handling devices and can provide monitoring, accounting and cash settlement functions. Preferably, the control unit and the cash handling devices are linked via RF communication devices employing one of the industry standard specifications, such as the Bluetooth specification, the IrDA specification, the Home RF specification or the SWAP protocol (an enhancement of the IEEE 802.11 standard). The Bluetooth specification requires operation in a universally available instrumentation, scientific, and medical (ISM) frequency band, and can be easily installed in known devices through the addition of a single Bluetooth radio microchip.

Other objects and advantages of the invention, besides those discussed above, will be apparent to those of ordinary skill in the art from the description of the preferred embodiments which follow. In the description, reference is made to the accompanying drawings, which form a part hereof, and which illustrate examples of the invention.

DETAILED DESCRIPTION OF THE PREFERRED EMBODIMENTS

Figure 1:
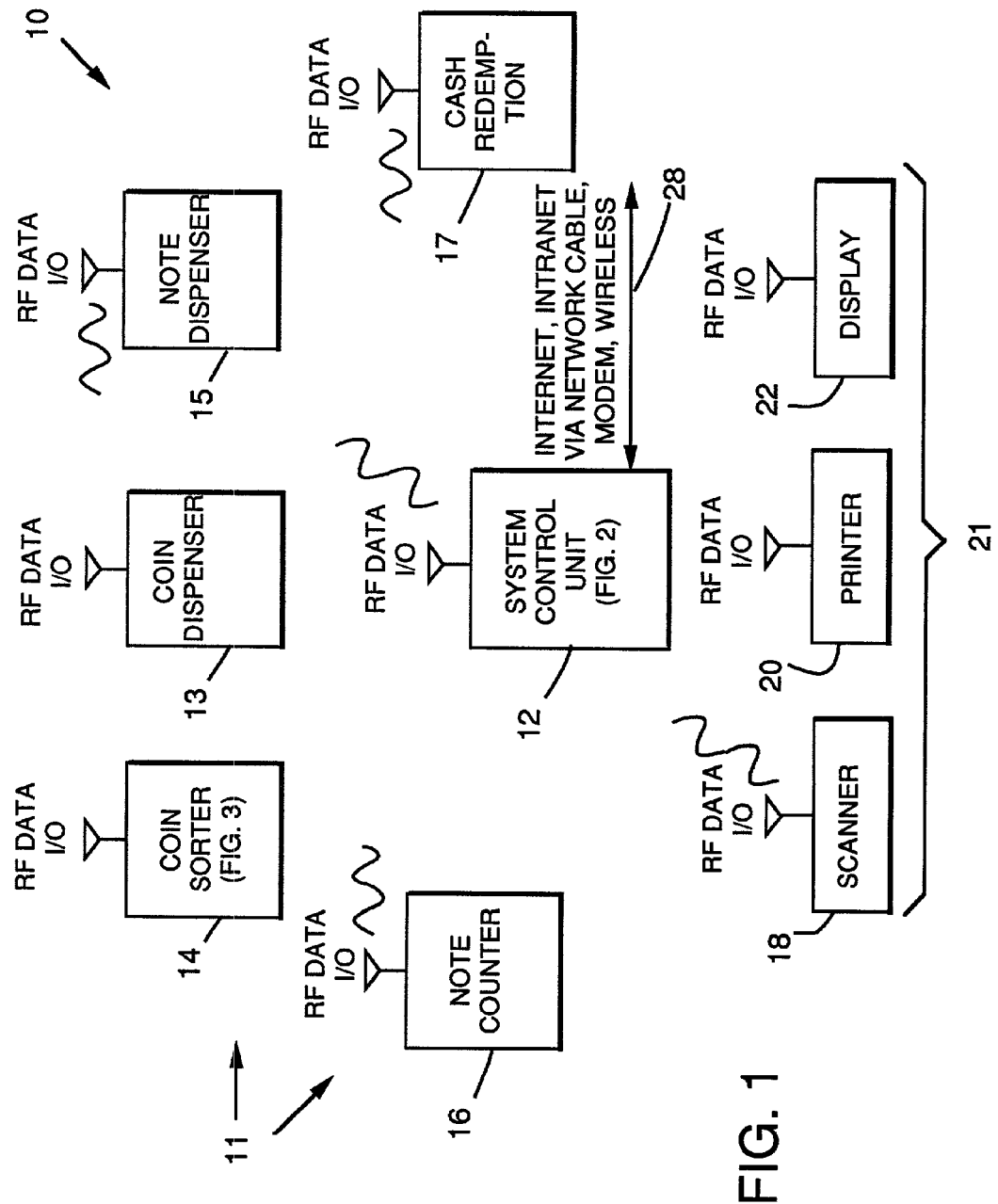
FIG. 1 is a block diagram of an automatic cash handling network constructed in accordance with the present invention.

FIG. 1 is a block diagram of a wireless cash management system 10 of automatic cash handling equipment in accordance with the present invention. The system 10 comprises a system control unit 12, which may be a network server, and a plurality of distributed cash handling devices 11, which communicate with the system control unit 12 through the wireless network. The cash handling devices 11 can include automatic cash handling machines such as coin sorters 14, note counters 16, coin dispensers 13, note dispensers 15, and cash redemption centers 17. The control unit 12 can also communicate with peripheral computer I/O devices 21 such as scanner 18, printer 20 and remote display 22. Each of the networked cash handling devices 11 and peripheral I/O devices 21 includes a transceiver 24 (FIG. 2) and an antenna 26 for transmitting and receiving data and instructions from other devices. Both cash handling devices 11 and peripheral I/O devices 21 can preferably communicate in both directions with the system control unit 12.

Figure 2:
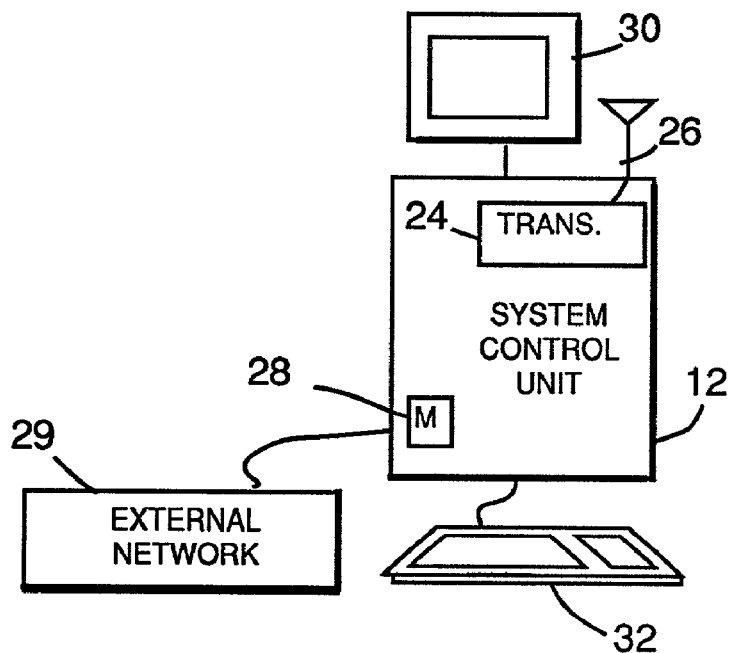
FIG. 2 is a block diagram of a control unit seen in FIG. 1.

Referring now to FIG. 2, a block diagram of the system control unit 12 is shown. The system control unit 12 preferably comprises a computer, such as a personal computer, workstation, or other computing device. The control unit 12 includes a transceiver 24 and antenna 26 for communicating data to and from the cash handling devices 11, and a network communications link 28 for coupling the control unit 12 to an external network 29 such as a LAN (local area network), WAN (wide area network), the Internet, or to an intranet network. The transceiver 24 is preferably an RF transmitter and receiver operating in accordance with the Bluetooth communications specification. However, transceivers operating according to other specifications such as IrDA for infrared communication ports, Home RF and SWAP (Shared Wireless Access Protocol) (IEEE 802.11) can also be used. These networks operate in a range of frequencies which are available for locally distributed systems in which the equipment is no further apart than a range of from approximately 2 meters to approximately 100 meters. Depending on the application, the network communications link 28 can include any of a number of different types of modems including telephone line modems, DSL modems, satellite network modem, or broadband cable modems, a network cable, or any of a number of other communications links known to those who practice in the art. The control unit 12 can additionally be coupled to a display 30, keyboard 32, or other known peripheral I/O devices typically used with computers. The control unit 12 is programmed to transmit data and commands to the peripheral cash handling and I/O devices and to receive data from these devices, and preferably to provide accounting and cash settlement functions as will be described more fully below.

Figure 3:
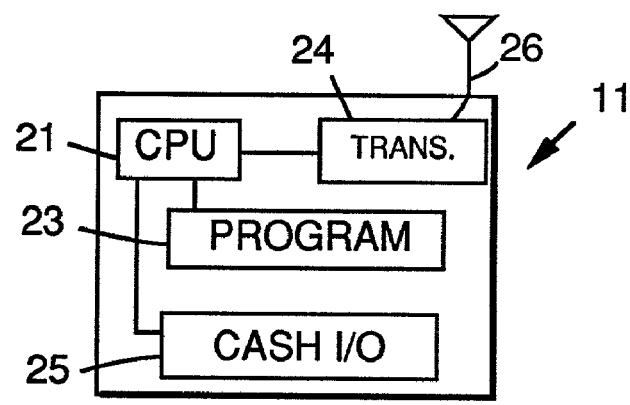
FIG. 3 is a block diagram of a cash handling machine seen in FIG. 1.

Referring now to FIG. 3, a block diagram of a typical cash handling device 11 is shown. Each cash handling device 11 comprises hardware and/or software for calculating, storing, processing and transferring data. In the block diagram of FIG. 3, these functions are provided by a controller or CPU 21, a program memory 23 storing a control program 31 for execution by a CPU 21 and an RF transceiver 24 and an antenna 26. Other suitable hardware configurations will be apparent to those of ordinary skill in the art. Each cash handling device 11 includes additional hardware and/or software 25 for providing one or more selected cash management functions (labeled "Cash I/O" in FIG. 3). In some applications, the cash handling device 11 can also include a display such as an LED or LCD readout for providing error, cash dispensing, or other information to a user.

As noted above, cash handling devices 11 include coin sorters 14, note counters 16, coin dispensers 13, and note dispensers 15, and cash redemption machines 17. These devices can be used as stand alone cash handling devices, or combined with other components into cash redemption machines 17, which combine a number of automatic cash handling devices to provide a selected function or functions. Examples of cash redemption centers can include ATM's, coin-for-note exchange machines, coin-for-voucher redemption centers, vending machines, and other devices.

The coin sorter 14 is a device for receiving, sorting coins into various denomination levels and totalizing the coins by denomination and by batch totals. In some applications, coin sorters can be combined with coin dispensers and other devices for providing packages having a predetermined number of coins. Sorters can also be used in vending and other types of cash handling machines. The coin dispenser 13 provides a selected number or value of coins to a customer, and is commonly used in change dispensing machines, gaming machines, vending machines, and other devices.

The note counter 16 can be a device for counting and totalizing a number of notes of a single denomination, and can include a scanner for differentiating, sorting, and totalizing notes of varying denominations. A note dispenser 15 is used to count and distribute notes to a customer, and is commonly combined with a note counter for dispensing cash in devices such as ATM's, as well as in vending machines, automated machines for exchanging coins for notes, and foreign currency exchange units. Such devices can be found in gaming establishments, as well as in lending institutions or other locations.

The peripheral I/O devices 21 can include a number of typical devices configured to include a transceiver for communicating with the control unit 12. Such devices can include scanner 18, printer 20 and remote displays 22, as shown in FIG. 1. The printer 20 can, for example, provide hard copy documents accounting for cash received at or distributed from each of the distributed cash handling devices, while the display 22 can provide a remote real-time count of cash received and distributed at each of the devices. The scanner 18 can be used in a number of known ways, including as an input device for receiving coupons or vouchers, or as a means for identifying employee or customer identification cards. Other input devices (not shown) such as keyboards, voice recognition systems, or retinal scanners can also be used as peripheral devices. Peripheral devices can also include fax machines, LED or LCD text displays, video displays, and other devices. Communication devices such as pagers, cellular phones, personal digital assistants, and laptops can also be employed as peripheral I/O devices 21. These devices can be used, for example, to provide a signal to a floor manager indicating that a given cash handling machine is empty or full, requires maintenance or service.

In operation, each of the cash handling devices 11 is programmed to calculate and/or store data related to a specific cash handling operation. Coin counters and note counters 16, for example, can provide data such as total value of cash counted, a tally of the available notes or coins by denomination, or other information. Similarly, coin dispensers 13 and note dispensers 15 can provide accounting data such as total value of cash distributed, total number of coins or notes of a single denomination distributed, or a total of the remaining cash available in the dispenser. Cash handling devices 11 which include wrapping or banding functions can also provide a tally of available rolls or stacks of coins or notes in specific denominations. In addition, the cash handling devices 11 can detect, store, and transmit status information including data related to error conditions encountered, and maintenance or service data.

Data collected by the cash handling machines 11 is transmitted to the system control unit 12, which can be programmed to provide a number of functions, depending on the application. The control unit 12 can, for example, be programmed to provide accounting functions. Examples of such functions include monitoring available cash levels, providing cash settlement functions, where cash received is compared to cash expected in a transaction, and batching functions, for example, accepting data related to coins and notes counted and dispensed in a single batch deposit or withdrawal. The control unit 12 can also provide error and maintenance monitoring for each of the cash handling devices 11. The cash handling devices 11 can, for example, be monitored to assure proper accounting, and to provide error histories to service personnel.

In addition to these accounting functions, the control unit 12 can provide commands to the cash handling devices 11. Commands can include, for example, instructions to halt operation of a malfunctioning cash handling device and/or provide an error display, instructions to display a machine empty, machine full, or other warning messages, and instructions to switch to a new batch for a counting operation. The control unit 12 can also be used to maintain database information related to completed transactions, malfunctions and system errors, machine usage, and other data.

The control unit 12 can also provide commands to and receive data from peripheral I/O devices 21. As noted above, the control unit 12 can provide data to a printer 20 or display 22 to display batch information, error information, accounting totals, total number of coin or note denominations available, coin or notes available at each cash handling device 11, or other information. The control unit 12 can also provide error or maintenance information, including "machine full" or "machine empty" information to communication devices such as pagers and cellular phones. This information can assure rapid rectification of such conditions and prevent down time for coin or note dispensing and receiving machines. The control unit 12 can also receive information from peripheral I/O devices 21. For example, batch information and employee identification information can be received from a peripheral bar code or scanner device 18. Peripheral devices 21 such as scanners and keyboards can also be used to scan and verify vouchers, debit and credit cards, customer identification cards, and other information.

Although a number of applications of the present invention will be apparent to those of ordinary skill in the art, one example of the use of the present system is in a banking application. One common banking application involves a teller receiving a deposit from a customer, in conjunction with a deposit slip. The teller applies the deposit to a number of stand alone cash handling machines to count the deposit. Such devices can include, for example, a note counter 16 and a coin counter. The note counter 16 and coin counter 14 each calculate the value of and/or number of coins and notes received, and transmits the total to the control unit 12, and the control unit 12, using cash settlement software, can rectify the counted deposit versus the deposit slip. The results can be forwarded to the teller or other personnel via a display 22 or printer 20. Totals can be forwarded from the control unit 12 to an external network 29 such as an intranet, where data can be monitored by a supervisor or other personnel. In some applications, a computer peripheral I/O device 21 such as a scanner 18 can be used to apply a bar code identifier to each deposit, and to each teller or employee.

A second example of an application of the present invention is in the gaming industry. In this application, a number of gaming devices including coin counters 14 coupled to gaming machines, and more sophisticated cash redemption centers 17 such as coin-for-note exchange machines and other devices can be communicatively coupled to the system control unit 12. The system control unit 12 can monitor overall cash levels and machine operation to maintain appropriate levels of cash in each gaming machine and to prevent machine down time due to high or low cash levels or other error or maintenance problems.

Although a number of known RF transceiver devices can be used in the present invention, including those operating according to the IrDA specification, the Home RF specification or the SWAP protocol, communications between the system control unit 12 and cash handling devices 11 is preferably provided in accordance with the Bluetooth specification. Bluetooth communications are provided by a single chip Bluetooth radio comprising a radio-frequency transceiver, a baseband link control unit and associated link software, and an antenna subsystem. The radio uses frequency-hopping spread-spectrum technology in the unlicensed industrial, scientific, and medical (ISM) band. In North America and most of Europe, frequency hopping occurs over seventy-nine channels spaced 1 MHz apart between 2.4 and 2.56 GHz. Bluetooth radios switch frequencies up to 1600 times per second, and the data packets are kept small, so as not to interfere with other RF devices nearby.

The baseband protocol of the current Bluetooth specification allows for both circuit and packet switching. Data is transmitted via asynchronous links dedicated to data access links such as dial-up networks, facsimile, and local area network access. These links can use a number of known protocols. In the present application, the links between devices are preferably selected to emulate an RS-232 serial link. This link emulates the communication method employed in prior art serial communication networks, and can therefore be easily implemented and integrated with existing devices. Communications can be point-to-point between the control unit 12 and one cash handling device 11 or point-to-multipoint between the control unit 12 and a plurality of cash handling devices 11. Security features, including authentication and encryption algorithms, can be used to secure communications between devices.

Under the current Bluetooth specification, up to eight Bluetooth devices can be automatically linked together into a "piconet". Each piconet includes one master and up to seven slave devices, and is distinguished from surrounding piconets by the selected frequency hopping sequence. By attaching one cash handling machine 11 in a first piconet to a control unit 12 in a second piconet, piconets can be linked together into "scatternets". The scatternets allow communication among continually flexible configurations of host devices and client devices.

Referring again to FIG. 1, in the preferred embodiment, each of the cash handling devices 11 and the control unit 12 are constructed to include a Bluetooth radio. Each control unit 12 is connected for RF communication with a plurality of cash handling devices 11 via an RF link utilizing an RS-232 communication cable and protocol, constructed in accordance with the Bluetooth specification. Each of the control units can be coupled together in a network such as a LAN (local area network) or WAN (wide area network), but is preferably communicatively coupled to a public communications link such as an intranet or Internet communications link. This link can be provided through a Bluetooth RF connection or an alternative modem connection, such as those described above. Although an RS-232 connection has been described, this implementation has been made to provide ease of transition between existing equipment and the preferred embodiment.

This has been a description of the preferred embodiment and some alternative embodiments. For the embodiments falling within the spirit and scope of the present invention, reference is made to the claims which follow.

The invention claimed is:

1. A wireless networked cash management system, comprising:
   at least one cash handling device in the system for performing at least one of the operations of coin sorting, coin counting, note counting, note sorting and cash redemption;
   a system control unit for performing at least one of a plurality of operations of accounting for cash dispensing by the cash handling device, providing for cash settlement of transactions carried out by the cash handling device and monitoring maintenance information, said control unit also providing commands to the cash handling device for operation of the cash handling device; and
   wherein said cash handling device and said system control unit communicate through a wireless communication network operating according to a standard for locally distributed wireless networks; and
   wherein the locally distributed wireless network communicates directly without intermediate servers and within a range between the cash handling device and the control unit of no more than approximately 100 meters.

2. The cash management system of claim 1, wherein the cash handling device is a coin handling device for performing at least one of the operations of coin sorting, coin counting and cash redemption.

3. The cash management system of claim 2, further comprising a currency handling device for performing at least one of the operations of note sorting, note counting and cash redemption, wherein said currency handling device and said control unit communicate through the wireless communication network.

4. The cash management system of claim 1, wherein the cash handling device is a currency handling device for performing at least one of the operations of note sorting, note counting and cash redemption.

5. The cash management system of claim 1, 2, 3 or 4, further comprising at least one I/O device, wherein the I/O device is a cell phone or a personal digital assistant.

6. The cash management system of claim 1, wherein the system control unit is electrically connected to a second network selected from a group consisting of: the Internet, an intranet, a LAN and a WAN.

7. The cash management system of claim 6, wherein the second network utilizes at least one of a telephone dial-up modem, a digital satellite link modem and a broadband cable modem.

8. The cash management system of claim 1, wherein the wireless communication network operates according to a Bluetooth specification.

9. The cash management system of claim 8, wherein the wireless communication network further operates according to an RS-232 protocol.

10. The cash management system of claim 1, wherein the wireless communication network operates in a frequency hopping, spread spectrum range of frequencies in a range from 2.4 Ghz to 2.56 GHz.

11. The cash management system of claim 1, wherein the wireless communication network operates in an infrared frequency range according to an IrDA standard.

12. The cash management system of claim 1, wherein the wireless communication network operates in a piconet distinguished from other networks by a selected frequency hopping sequence.

13. A wireless networked cash management system comprising:
   a system control unit including a radio frequency transceiver; and
   a cash handling device, the cash handling device including a radio frequency transceiver for communicating cash handling data and status data to the control unit;
   wherein the transceivers communicate directly with each other without the assistance of servers and wherein the transceivers communicate within a range of no more than approximately 100 meters; and
   wherein the system control unit performs at least one of the operations of accounting for cash dispensing by the cash handling device, providing for cash settlement of transactions carried out by the cash handling device and monitoring maintenance information.

14. The cash management system of claim 13, wherein the transceiver of the control unit and the transceiver of the cash handling device each comprise a Bluetooth radio.

15. The cash management system of claim 13, wherein the transceiver of the control unit and transceiver of the cash handling device operate in the infrared frequency range according to an IrDA standard.

16. The cash management system of claim 13, wherein the cash handling device is a coin handling device for performing at least one of the operations of coin sorting, coin counting and cash redemption.

17. The cash management system of claim 13, wherein the system control unit comprises a personal computer that performs at least one of the operations of accounting for cash dispensing, providing for cash settlement and monitoring maintenance information for a plurality of cash handling machines.

18. The cash management system of claim 13, further a comprising computer peripheral I/O device which is at least one of a printer or a visual display.

19. The cash management system of claim 13, wherein the cash handling device comprises at least one of a coin counting, coin sorting, note sorting, or note counting device.

20. The cash management system of claim 1 or 13, wherein the system control unit performs at least one of the operations of cash dispensing, providing for cash settlement and monitoring maintenance information without needing authorization of user access from a remotely located network host computer.

21. The cash management system of claim 1 or 13, wherein the system control unit performs both of the operations of providing for cash settlement and monitoring maintenance information.

22. The cash management system of claim 13, further comprising at least one I/O device, wherein the I/O device is a cell phone or a personal digital assistant.

* * * * *